May 27, 1930.  A. FLISS, JR  1,760,634
WATER HEATER
Filed Oct. 24, 1925   3 Sheets-Sheet 1
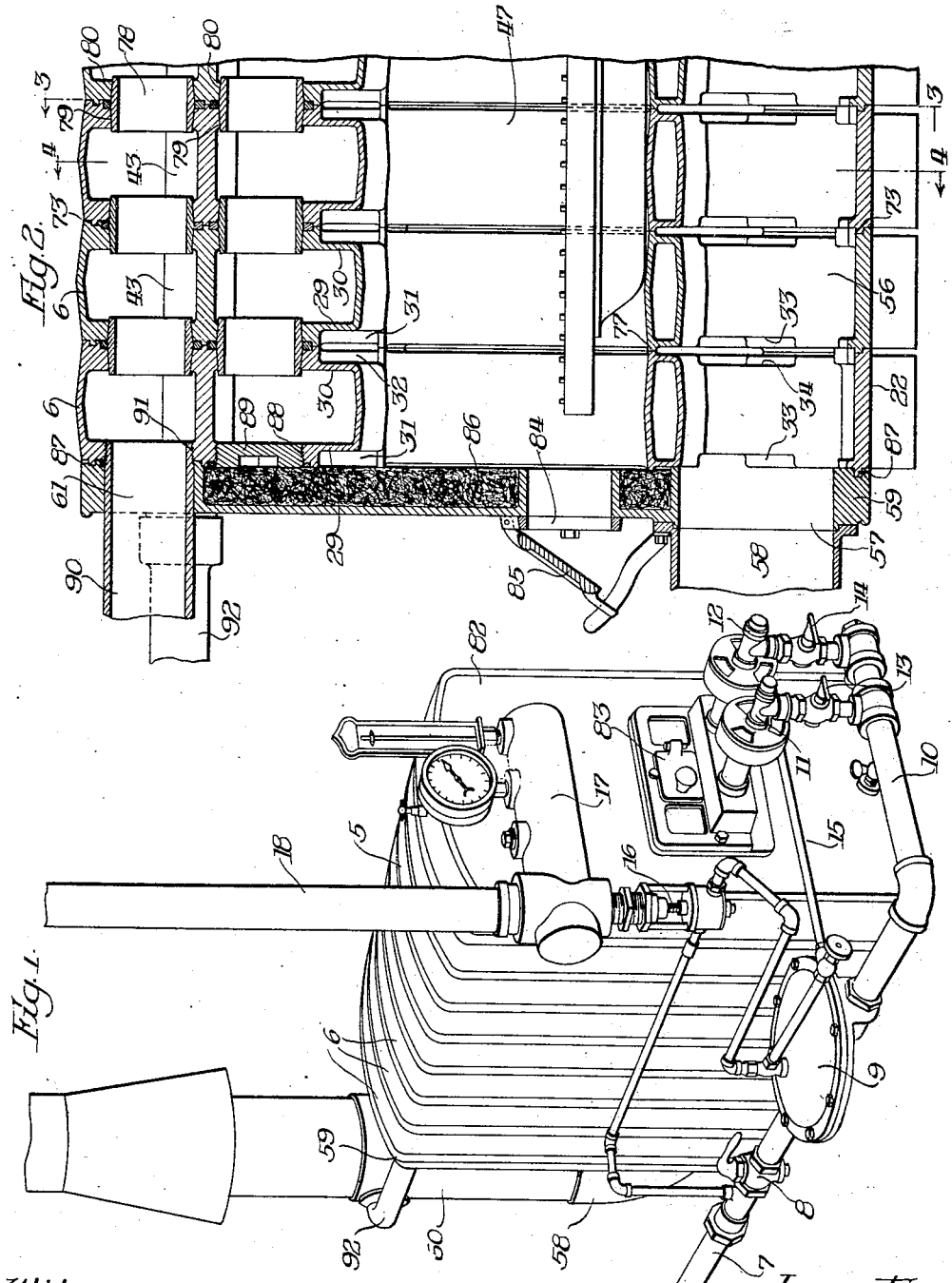

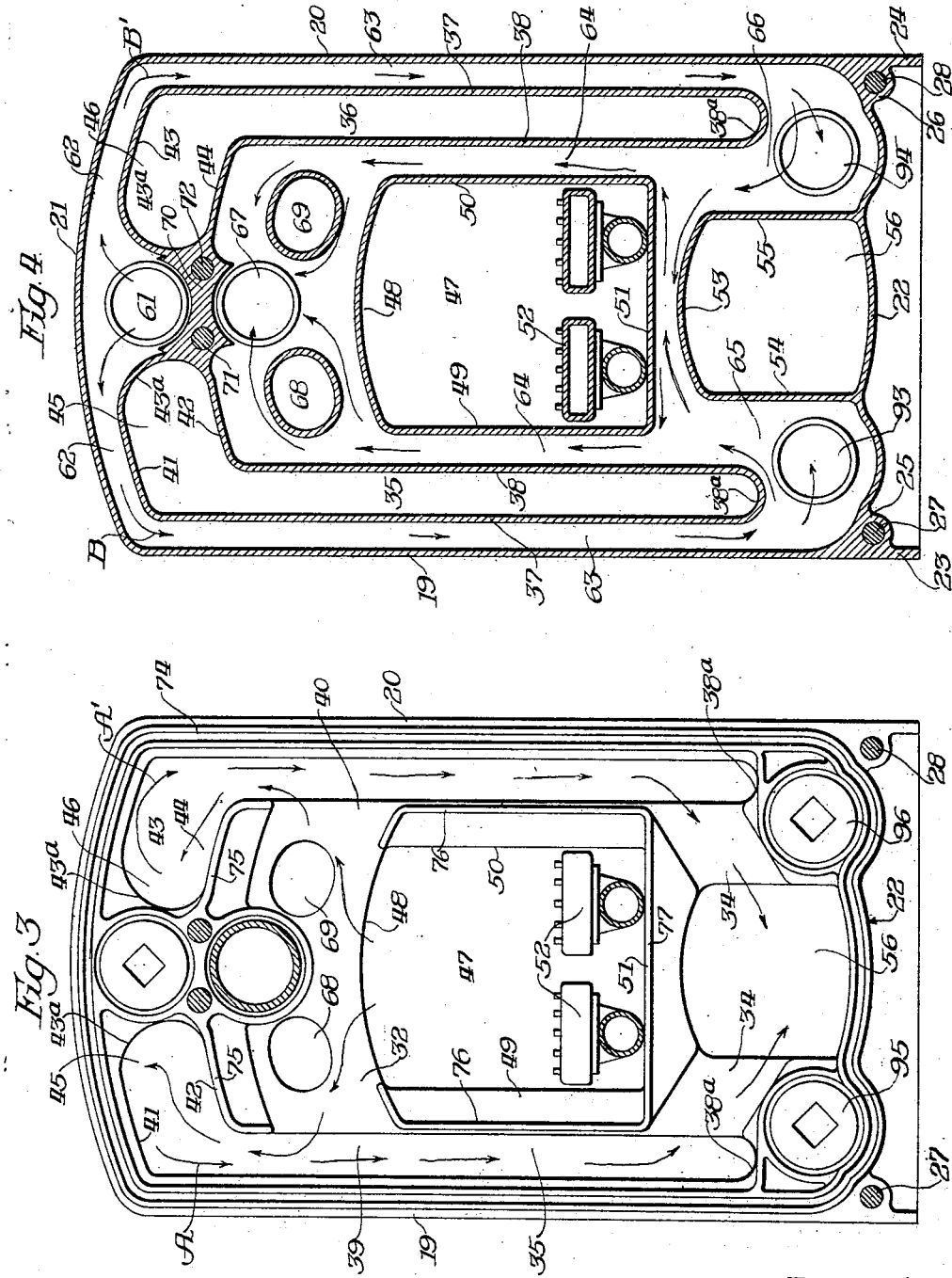

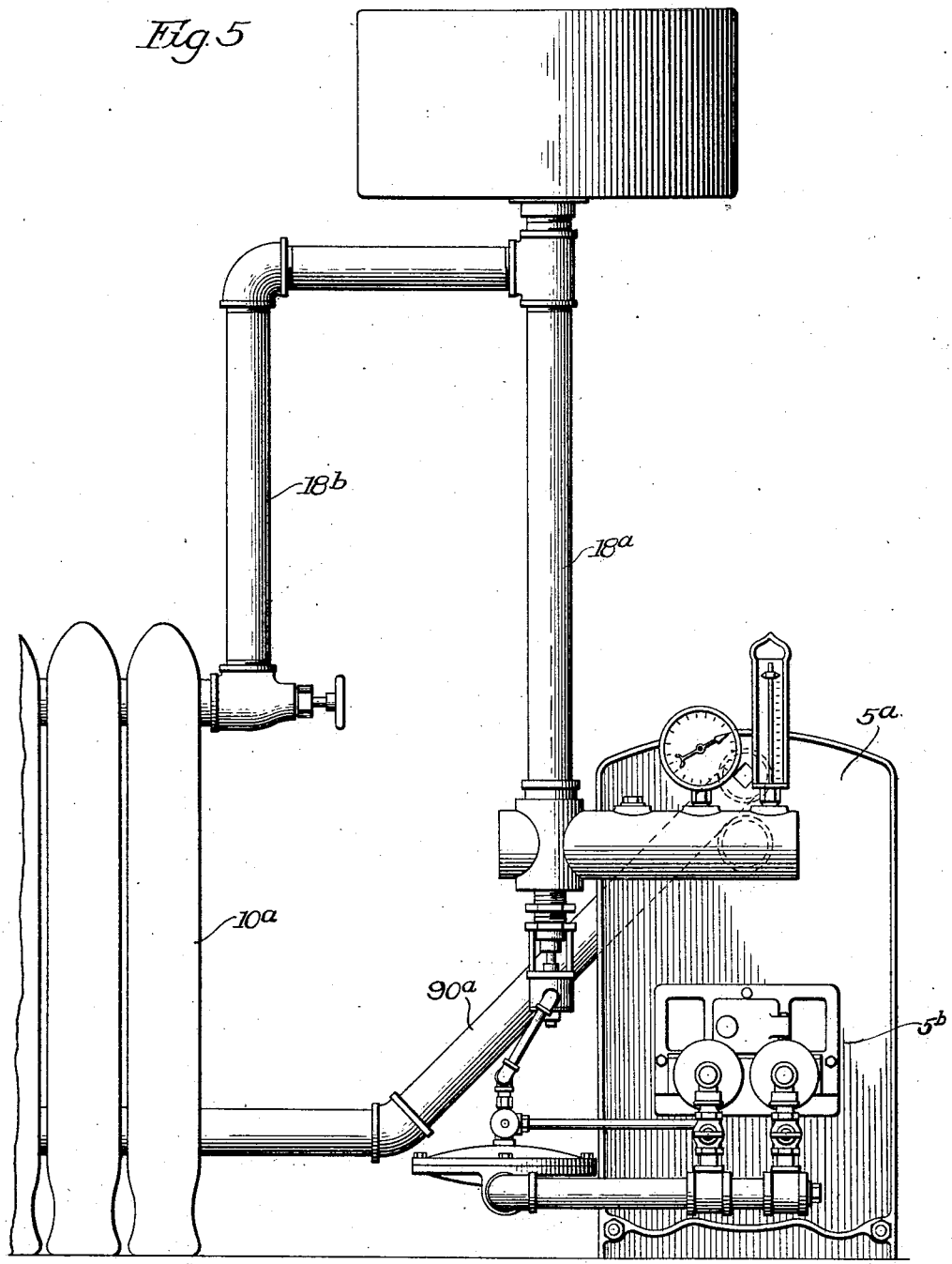

Patented May 27, 1930

1,760,634

UNITED STATES PATENT OFFICE

AUGUST FLISS, JR., OF CHICAGO, ILLINOIS, ASSIGNOR TO EVENHEAT MANUFACTURING COMPANY, OF CHICAGO, ILLINOIS, A CORPORATION OF ILLINOIS

WATER HEATER

Application filed October 24, 1925. Serial No. 64,552.

This invention relates broadly to liquid heaters and vaporizers, and more particularly to an improved form of water heater for use in supplying hot water to heating systems, and the device is of such nature that by slight modification, it may readily be adapted for use as a steam generator.

While the invention is described and illustrated as particularly adapted for use as a water heater, it will be understood that the device may be employed for heating other fluids, or may, as stated, be employed as a steam boiler, and, therefore, the invention finds a wide field of utility.

The primary objects of this invention reside in the provision of an improved liquid heater, wherein the liquid or other fluid to be heated is caused to pass through a circuitous path, and in which the heating medium is caused to flow through a similar path, substantially co-extensive with and adjacent to the path of flow of the fluid to be heated; the provision of an improved fluid heater, wherein the fluid to be heated is brought, upon its entrance into the device, into intimate proximity with the hottest part of the heating medium; the provision of an improved fluid heater, wherein the fluid to be heated is brought, just prior to discharge from the device, into intimate proximity to the hottest part of the heating medium; the provision of an improved method of heating a liquid or other fluid, which comprises initially bringing the fluid into proximity with the hottest part of a heating medium; maintaining the proximity of the heating medium and the fluid to be heated for a predetermined length of time, and then, just prior to discharge of the fluid to be heated, again subjecting it to the hottest part of the heating medium.

This invention is further characterized by the provision in a fluid heater of means for causing the fluid to be heated to flow in a direction contrary to gravity, and to similarly cause the heating medium to flow in a direction contrary to gravity, to lengthen the paths of travel in the heater, so that in a minimum of space a maximum of heat exchange takes place; the provision of a water heater in which the water is caused to flow downwardly after heating, and in which the hot gases from a combustion chamber are similarly caused to flow downwardly in proximity to the path of the liquid, and in which the liquid and hot gases are in substantially intimate proximity for a considerable period of time, from the initial heating until the discharge respectively of said liquid and gases.

This invention is still further characterized by the provision of an apparatus for obtaining the herein recited functions, which is simple and compact, in which a plurality of sections may be employed, depending upon the amount of liquid it is desired to heat, and in which such sections may be effectively connected together and sealed against the loss of heat units or of the liquid or other fluid to be heated.

This invention is still further characterized by the provision of means for causing the heating medium to pass through a relatively long path of travel before discharge and similarly to cause the fluid to be heated to pass through a relatively long path, so that it takes up a maximum amount of heat, and thereby increases the efficiency, reduces waste and renders more compact the whole apparatus. This arrangement permits the elimination of costly external heat insulating jackets, affords a large heating surface, reduces the size of the device, and removes the necessity of moving parts which do, in many apparatus now offered on the market, get out of order.

As will hereinafter be pointed out more particularly, this invention facilitates the use of a gaseous fuel, which has heretofore, for this purpose, been prohibitive, owing to the large cost of the fuel, and the invention includes means which renders the employment of gaseous fuel, such as ordinary city gas, absolutely safe, this means serving to prevent the collection of unconsumed gas in the heater in the event of accident to the lighting apparatus.

This invention is still further characterized by the provision of a heater for water heating systems such, for instance, as those used in the home, wherein the heater and the radiator may be placed on substantially the same level, thus permitting the heater to be employed in a basement and adequately supply radiators which may be placed in an adjoining or in the same room.

The foregoing and such other objects and advantages as may appear, or be pointed out, as this description proceeds, are attained in the structural embodiment illustrated in the accompanying drawings, in which Figure 1 is a perspective view of the apparatus of this invention installed and ready for operation;

Figure 2 is a vertical sectional view of a portion of the heater shown in Figure 1, taken along the central axis at the rear;

Figures 3 and 4 are vertical sectional views taken on the lines 3—3 and 4—4 of Figure 2, looking in the direction indicated by the arrows; and Figure 5 is an illustration of the device installed in a system having a radiator on the same level as the heater.

The method of heating a fluid incorporated in the present invention includes the provision of a heat source, which may be ordinary city gas or other gaseous fuel, or if desired, may be produced by an oil burner, or even by solid fuel, the heat gases from this source being brought immediately upon generation into contact with a passageway through which liquid or other fluid may pass. The fluid is caused initially, that is, upon its entrance, to be subjected to the hottest part of the heating medium, is caused to pass through a circuitous path against the force of gravity in proximity to the heating medium, which is similarly caused to pass through a path counter to gravity, and just prior to the discharge of the fluid, it is again subjected to the hottest part of the heating medium, so that the maximum number of heat units are drawn from the heating medium. In this manner so much of the heat is withdrawn from the hot gases to the fluid to be heated, that those gases which pass out through the exhaust flue are relatively cool.

To carry out the idea embodied in this invention, I provide a preferred structure, illustrated as an assembly or installation in Figure 1, the heater, in its entirety, being indicated at 5, and being composed of a series of heating sections 6, secured together in the manner which will be hereinafter described.

The structure shown in Figure 1 includes a gas main 7, this form of the invention employing gaseous fuel, such as ordinary city gas.

The gas main 7 includes a main plug valve 8 for cutting off the supply of gas, a pressure control device 9, commonly employed in such systems, an extending portion 10, and a plurality of burners, of which two are shown and designated 11 and 12. The burners 11 and 12 are controlled by suitable valves 13 and 14.

The conduit 15 serves to conduct gas to a pilot burner for igniting the burners 11 and 12, the pilot burner not being shown. The automatic control mechanism 16, water header 17, and hot water conductor 18 are conventional devices and do not enter into the essential features of the present invention.

Referring now to the detailed construction of the heater itself, reference may be had particularly to Figures 2, 3 and 4; Figure 2 illustrating the heater in longitudinal section, Figure 3 illustrating the arrangement of heat passages, and Figure 4 representing the passageways for liquid or other fluid to be heated.

For convenience in manufacture and to supply the demands of various installations, the heater is made up in sections, which may run anywhere from two to a dozen sections, depending upon the requirements. These sections are complemental to each other and are provided with complemental liquid and gas conducting passageways. For further convenience in manufacture, the sections are cast so that this eliminates the multiplication of joints, welded or otherwise.

A section includes an outer wall, which completely encompasses the section and is defined by the side portions 19 and 20, top portion 21 and bottom portion 22, feet 23 and 24 extending downwardly from the walls 19 and 20 and being enlarged and perforated at 25 and 26 to receive tie-bolts 27 and 28.

The section 6 is also defined by end walls 29 and 30, which are formed with depressed portions 31 and 32, an inspection of Figure 2 showing that the depressions 31 and 32 are complemental, so that a passageway for heated gases is afforded.

Additional depressions of the walls 29 and 30, indicated at 33 and 34, are provided near the bottom of the heating device, and the depressions 31 and 32, 33 and 34, together with vertical channels 35 and 36, defined by walls 37 and 38, form continuous heat passageways 39 and 40. The walls 37 and 38 are, at the bottom, joined by curved walls 38ª—38ª.

The passageways 39 and 40 are free openings to the sections, and by virtue of the walls 41, 42, 43 and 44, form heat pockets or recesses 45 and 46, adjacent to the upper part of the heater, these walls being joined by curved portions 43ª—43ª.

A combustion chamber 47 is provided, and is formed by virtue of the walls 48, 49, 50 and 51, and within this chamber are placed a battery 52 of burners, which preferably extend the length of the combustion chamber.

By the provision of the walls 53, 54, 55 and the bottom wall 22, an exhaust flue 56 for spent gases is afforded, and this flue is in communication with the passageways 35 and 36 by virtue of the depressions 34 and 39. Thus it will be seen that the flow of gases from the burners will be, as shown by the arrows A—A' in Figure 3, upwardly from combustion chamber 47 into the pockets 45 and 46, thence downwardly through the passageways 35 and 36, into the exhaust flue 56. This exhaust flue extends the entire length of the device beneath the combustion chamber, and, as indicated at 57 in Figure 2, is connected by an elbow 58 and a closing end wall 59 to a chimney 60.

The walls affording the combustion chamber, heat passageways and exhaust flue, define the water passageways which substantially surround the elements mentioned, that is, as will be seen from an inspection of Figures 2 and 4, the water passageways extend from the inlet 61 over the walls 41, 37, 38, through the spaces 62, 63 and 64, and connecting portions 65 and 66, above and below the combustion chamber and above and along the sides of the exhaust flue 56 to the water outlet 67.

The path of the liquid will thus be defined by the arrows B—B' shown in Figure 4.

In order to permit of further circulation of heat, the heat ports 68 and 69 are provided immediately adjacent to the liquid outlet 67, and the liquid circulates around the walls of these ports, as will be seen by an inspection of Figure 4.

A partition 70 connects the wall defining the recesses 45 and 46, and this partition is disposed between the water inlet 61 and the water outlet 67 and is of sufficient thickness to permit of perforations to accommodate the tie-bolts 71 and 72. The tie-bolts 27, 28 and 71 and 72, serve as the sole means for securing together a plurality of the sections to form one assembly.

When joining the sections together, they are placed in abutting relation, as shown in Figure 2, and as will be best seen from Figures 2 and 3, the adjacent end walls of the sections are provided with a tongue and groove connection indicated at 73, this connection extending around the outer margin or corners of the respective sections, as seen at 74 in Figure 3. A suitable sealing material, such as furnace putty, may be employed between sections to avoid loss of heat.

Between adjoining end walls of adjacent sections, and in order to prevent heat following any other path than that indicated, the passageways 32, 35, 36 and pockets 45 and 46 are bordered by outstanding flange portions 75, 76, 77, which abut complemental portions on an adjacent section, and thus, as seen in Figure 2, insure that the sections will evenly join and will not warp in use.

In the case of the water passageways, it is necessary that sealing joints be provided between adjoining sections, and to this end, as will best be seen in Figure 2, wedge nipples 78—78 are inserted into the openings 79 and 80 in adjoining sections, and when the sections are pressed together in assembly, an effective water seal is afforded.

The end or closing sections of the device, when assembled, as indicated at 59 and 82, may be substantially identical, the location of the water inlet and outlet pipes being different, owing to the level of the connecting openings, and the front section 82 having a door 83, affording access to the combustion chamber, this door being arranged for movement to vary the draught.

A draught opening 84 is provided in the rear closing wall 59, and is controlled by a door 85. The rear wall 59 is lined with fire clay 86, and this end wall is formed with a tongue and groove connection 87 to the adjacent end section of the heater.

To close the end opening 88 in the inmost rear section, a screw plug 89 is inserted and the water inlet pipe 90 is similarly threaded at 91 into the water inlet of the heater.

In order to prevent the collection of explosive gas in the heating device in the event that the pilot burner should be blown out and the main burners then turned on, a gas vent 92 to the chimney 60 is provided, and thus any gas which collects in the combustion chamber will be carried off through the vent 92. The vent is not of such size, however, to divert the heat in any large degree from its path of travel, as shown in Figure 3.

In order to permit cleaning of the water chambers and passageways, communicating ducts 93 and 94 are provided between adjoining sections, and the endmost section has its outer communicating openings closed by screw plugs 95 and 96, as shown in Figure 3.

It will be seen from the foregoing that the paths of travel of the hot gases and water are relatively long, that the heating medium is in intimate proximity to the liquid from the time of entrance until discharge, that to attain this end the hot gases and liquid are caused to flow in directions contrary to the force of gravity, and that any tendency of the liquid to cool is checked by first bringing it into proximity to the hottest part of the heating medium, maintaining proximity of the hot gases and liquid throughout their paths of flow, and finally again bringing the liquid into proximity to the point of greatest heat just prior to discharge, thereby extracting the greatest possible number of heat units from a source of heat of a given temperature.

Referring now to Figure 5, it will be observed that the heater 5ª is connected with a radiator 10ª, placed on substantially the same level therewith, that is, the combustion chamber 5ᵇ of the heater is placed at such a low point, which is impracticable in all heaters known to me, thus permitting the installation of a radiator on the same floor with the heater. The combustion chamber is located below the radiator, so that this arrangement may be carried out successfully.

I claim:

1. A liquid heater including a liquid passageway having substantially adjacent inlet and outlet portions separated by a partition, a combustion chamber substantially surrounded by said liquid passageway, and disposed adjacent to and below said outlet, and a passageway for products of combustion connected to said combustion chamber and interposed in said liquid passageway and having a portion adjacent to said inlet and outlet and separated therefrom by a heat conducting wall.

2. In a device of the character described, in combination, a liquid inlet and outlet and a tortuous substantially continuous liquid passageway communicating therewith, having spaced parallel legs, a combustion chamber, said inlet and outlet being adjacent to each other and the outlet adjacent to said chamber, and separated therefrom and from each other by a heat conducting wall, and a tortuous substantially continuous passageway for a heating medium leading from said chamber past said liquid outlet and inlet and extending between said legs.

3. The method of heating fluid which includes as steps thereof causing a heating medium to flow adjacent to an adjacent fluid outlet and inlet, then causing the fluid to be heated to flow from the inlet together with the heating medium in substantially parallel contiguous paths to a point below the source of heat medium, then causing the fluid to be heated to reverse and flow past the source of heating medium and thence to the outlet.

4. In a liquid heater, a combustion chamber, a passageway leading from said chamber for conducting the heating medium, a liquid inlet above said combustion chamber, a passageway for liquid adjacent to said first mentioned passageway and substantially encompassing said combustion chamber, and a liquid outlet above said combustion chamber isolated at that point from said inlet but connected with said inlet by said liquid passageway, said inlet and outlet being adjacent but separated from each other by a heat conducting wall, and the passageway for said heating medium having a pocket adjacent to both said inlet and outlet.

5. In a liquid heater, a liquid conductor having an inlet and an outlet, means for causing a liquid to flow in said conductor in a direction counter to gravity, and means for conducting the major portion of a heating medium substantially initially into contact with the outlet, then into contact with the inlet and said heating medium being conducted subsequently into contact with said liquid conductor in a direction counter to gravity.

In testimony whereof I have hereunto signed my name.

AUGUST FLISS, Jr.